(12) United States Patent
Ghaemi

(10) Patent No.: US 12,179,847 B1
(45) Date of Patent: Dec. 31, 2024

(54) TRANSPORT VEHICLE WITH AN EXPANDABLE CARGO BAY

(71) Applicant: Michael Ghaemi, Palm Beach Gardens, FL (US)

(72) Inventor: Michael Ghaemi, Palm Beach Gardens, FL (US)

( * ) Notice: Subject to any disclaimer, the term of this patent is extended or adjusted under 35 U.S.C. 154(b) by 327 days.

(21) Appl. No.: 17/841,800

(22) Filed: Jun. 16, 2022

(51) Int. Cl.
*B62D 21/14* (2006.01)
*B62D 33/027* (2006.01)
*B62D 33/08* (2006.01)

(52) U.S. Cl.
CPC ......... *B62D 33/0276* (2013.01); *B62D 21/14* (2013.01); *B62D 33/08* (2013.01)

(58) Field of Classification Search
CPC .. B62D 33/0276; B62D 21/14; B62D 33/027; B62D 33/03; B60P 3/42; B60P 3/40; E04B 1/343; E04B 1/34305; E04B 1/3431; E04B 1/34312
USPC .......... 296/100.153, 10, 26.01, 26.02, 26.04, 296/26.05, 26.09, 26.13
See application file for complete search history.

(56) References Cited

U.S. PATENT DOCUMENTS

| | | | | |
|---|---|---|---|---|
| 3,415,567 A * | 12/1968 | Mcchesney | ............. | B60P 3/055 296/3 |
| 3,482,716 A * | 12/1969 | Leadley | .................... | B60P 1/54 296/26.02 |
| 4,695,087 A * | 9/1987 | Hollrock | ................ | B62D 33/02 296/26.02 |
| 5,154,469 A * | 10/1992 | Morrow | ................. | B62D 21/14 296/26.02 |
| 6,644,708 B1 * | 11/2003 | Grzegorzewski | .. | B62D 33/0273 296/100.06 |
| 7,506,909 B2 * | 3/2009 | Barnes | .................... | B62D 33/08 296/26.12 |
| 7,810,834 B2 | 10/2010 | Schneider et al. | | |
| 11,059,423 B1 * | 7/2021 | Weaver | ................ | B62D 33/027 |
| 11,247,735 B2 * | 2/2022 | Williams | ............... | B62D 33/03 |
| 11,498,472 B2 * | 11/2022 | König | ................... | E04B 1/3431 |
| 11,530,001 B2 * | 12/2022 | Williams | ........... | B62D 33/0273 |
| 2005/0093339 A1 * | 5/2005 | Klassen | ................. | B62D 33/03 296/183.1 |

* cited by examiner

*Primary Examiner* — Amy R Weisberg
*Assistant Examiner* — Whitney Nicole Francis
(74) *Attorney, Agent, or Firm* — Sanchelima & Associates, P.A.; Christian Sanchelima; Jesus Sanchelima

(57) ABSTRACT

A transport vehicle with an expandable cargo bay including a transport vehicle assembly with a cargo housing assembly mounted on the rear side of the transport vehicle assembly and an expandable container assembly. Transport vehicle assembly includes a panel control to control a hydraulic actuator. Cargo housing assembly includes a cargo housing with a hollow housing side having slidable panels attached through fastener and guide rails thereof to be propelled by hydraulic actuators wherein slidable panels have height panels with same mechanism. Expandable containers assembly includes expandable container members located below a cargo housing to be extended outwardly by a hydraulic actuator. Expandable container members include hydraulic actuators and guide rails with fasteners rails attached on internal sides of expandable containers and inside thereof through apertures to extend protruding portions and slidable portions.

15 Claims, 5 Drawing Sheets

TRANSPORT VEHICLE WITH AN EXPANDABLE CARGO BAY

1. FIELD OF THE INVENTION

The present invention relates to a transport vehicle with an expandable cargo bay and, more particularly, to a transport vehicle with an expandable cargo bay that includes a transport vehicle with a multi expandable container attached at the back of the transport vehicle on a cargo housing having a hydraulic rail system allowing to expand sides of container in different directions.

2. DESCRIPTION OF THE RELATED ART

Several designs for a transport vehicle with an expandable cargo bay have been designed in the past. None of them, however, include a transport vehicle with an expandable cargo bay including an expandable cargo container that is comprised of a cargo housing having an hydraulic rail system that permit cargo housing to expand as needed.

Applicant believes that a related reference corresponds to U.S. Pat. No. 7,506,909 issued for an expandable truck bed that can laterally expand and retract. Applicant believes that another related reference corresponds to U.S. Pat. No. 7,810,834 issued for an expandable trailer with extension members which allow the frame to lengthen. None of these references, however, teach of a transport vehicle with an expandable cargo container that is comprised of a transport vehicle with an expandable cargo container that is comprised of a transport vehicle with a cargo housing that contains a hydraulic rail system that allows the cargo housing to expand in height, width, and length to accommodate different sized loads.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a transport vehicle with an expandable cargo bay including adjustable panels that slides through rails to propelled by hydraulic actuators.

It is another object of this invention to provide a transport vehicle with an expandable cargo bay including an adjustable size vehicle for a truck.

It is still another object of the present invention to provide a transport vehicle with an expandable cargo bay including expandable containers with sub expandable containers.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
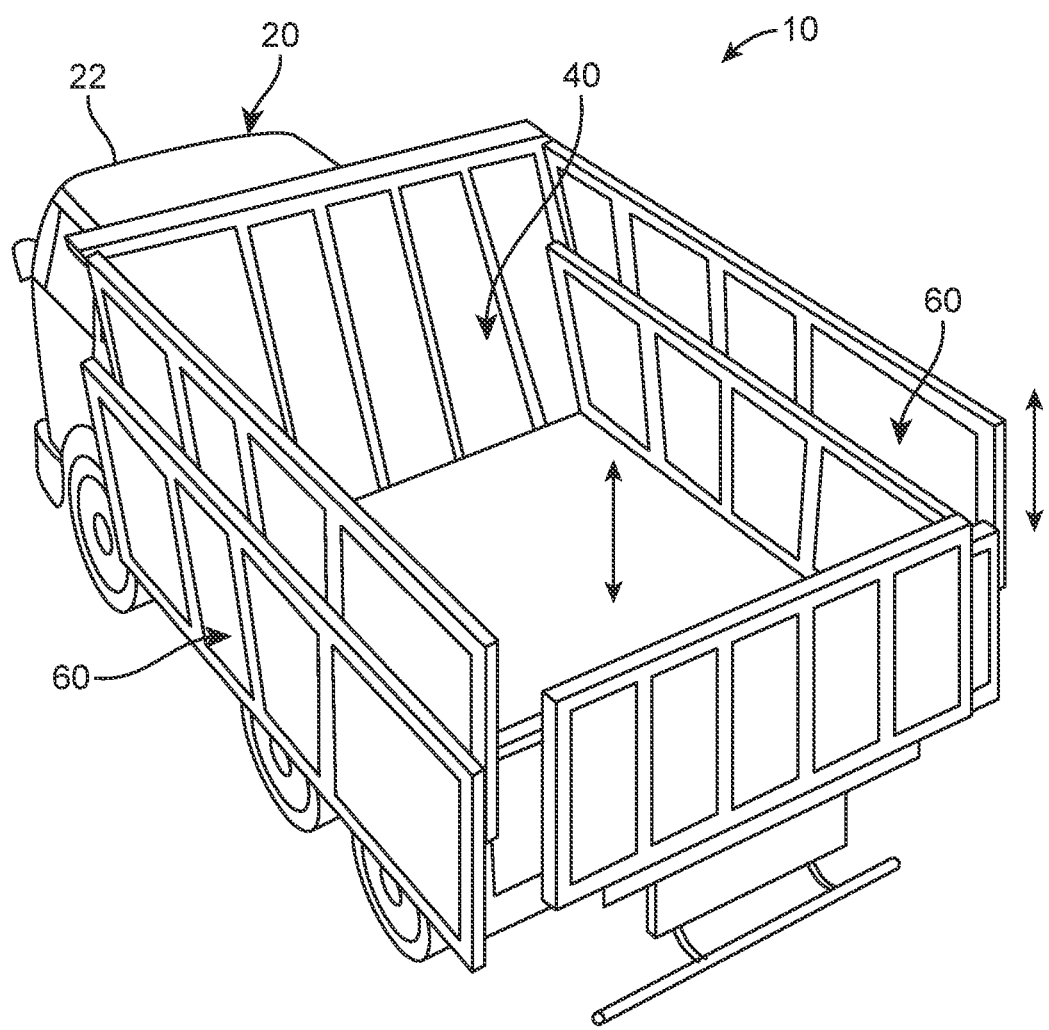

With the above and other related objects in view, the invention consists in the details of construction and combination of parts as will be more fully understood from the following description, when read in conjunction with the accompanying drawings in which:

FIG. 1 represents an operational view of the present invention 10. A transport vehicle assembly 20 having a cargo housing assembly 40 with a expandable container assembly 60.

Figure 2:
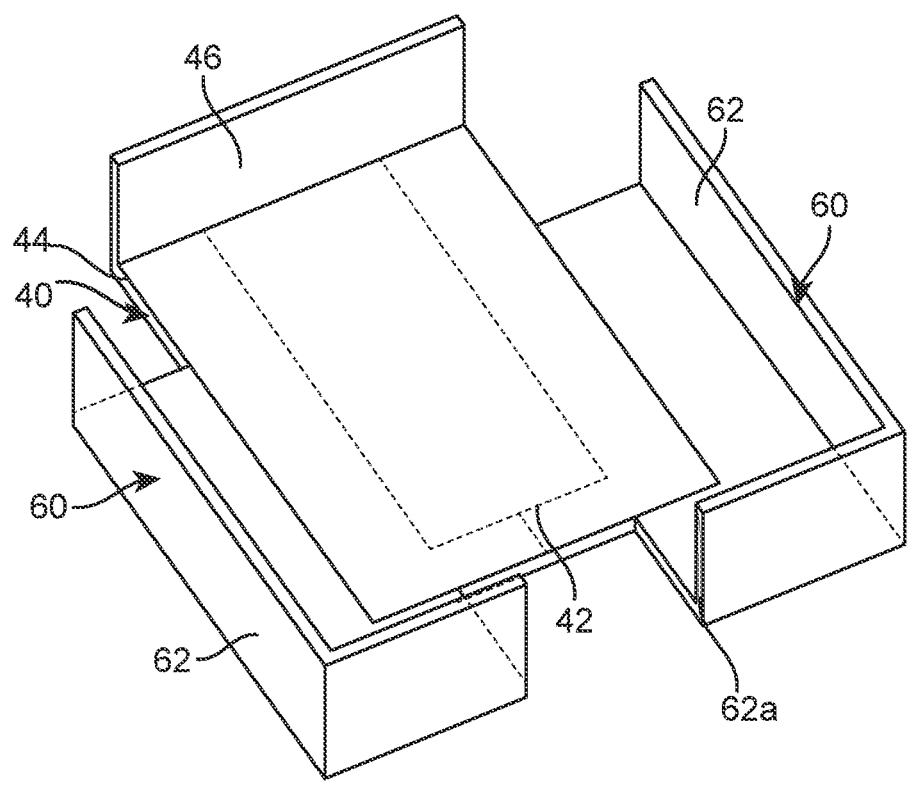

FIG. 2 shows a top perspective view of the cargo housing assembly 40 and expandable container assembly 60. Two expandable container members 62 extend from the bottom of the housing base 44.

Figure 3:
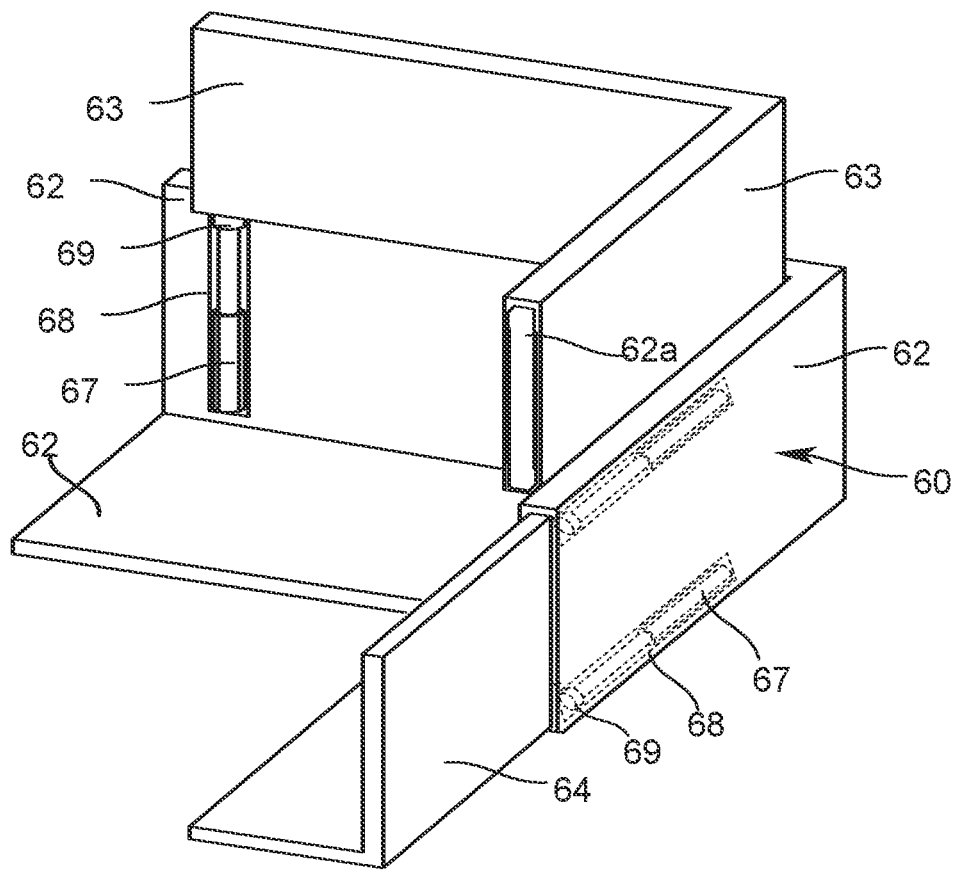

FIG. 3 illustrates a perspective view of one of the expandable container members 62 of expandable container assembly 60. One of the slidable panels 64 extend from one side of one of the expandable container members 62. One of the slidable panels 64 is attached by one of the fastener rails 69 and guide rails 68 and second hydraulic actuators 67.

Figure 4:
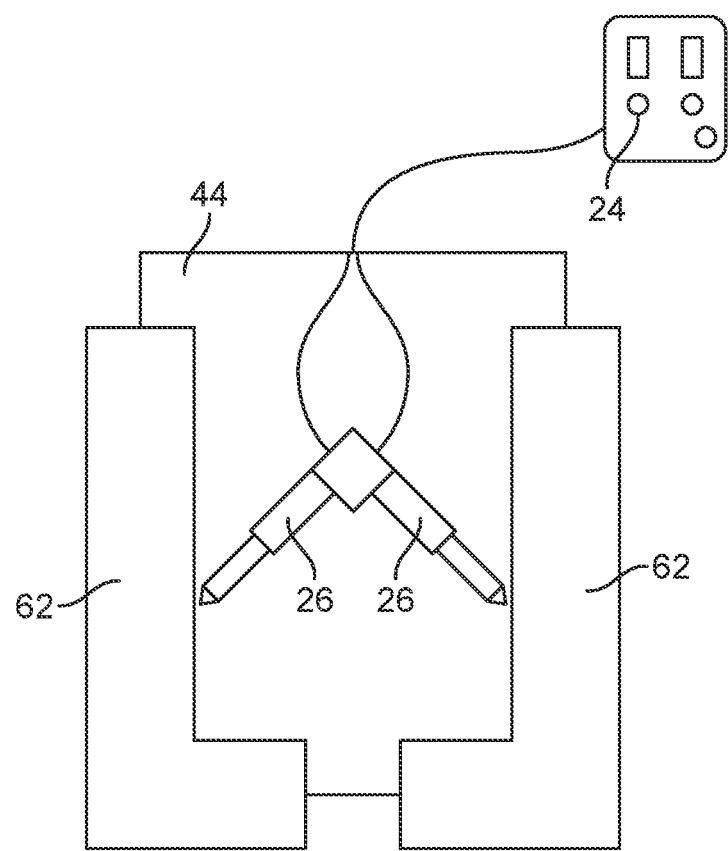

FIG. 4 is a representation of a bottom view of the housing base 44. Both expandable container members 62 are attached to first hydraulic actuators 26. First hydraulic actuators 26 are attached to a bottom side of housing base 44. First hydraulic actuators 26 extend outwardly from the bottom side of housing base 44 to push both expandable container members 62 controlled by a panel control 24.

Figure 5:
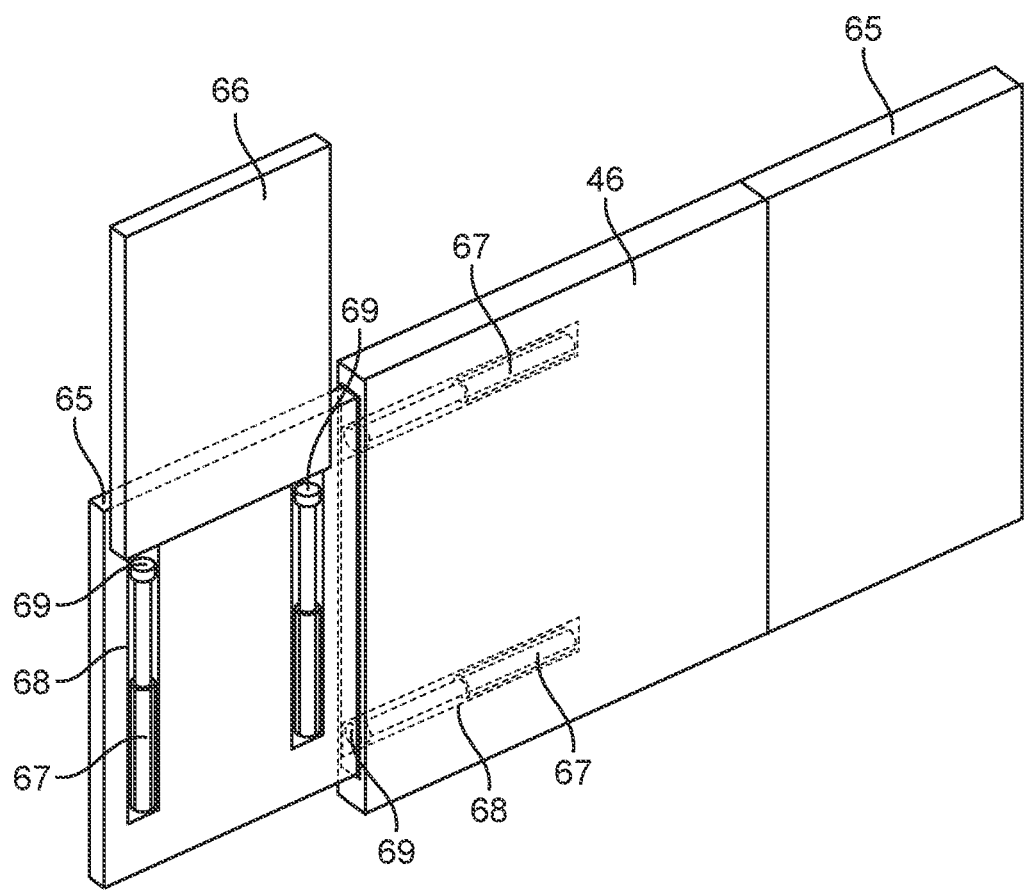

FIG. 5 is a representation of a perspective internal view of housing side 44 where one of the second slidable panels 65 extend from one of the sides of the housing side 44. Slidable panels 45 are attached by fastener rails 69 attached on guide rails 68 and second hydraulic actuators 67. Hydraulic actuators are attached inside guide rails 68. Slidable panels 45 have attached housing sides 46 therein.

V. DETAILED DESCRIPTION OF THE EMBODIMENTS OF THE INVENTION

Referring now to the drawings, where the present invention is generally referred to with numeral 10, it can be observed that it basically includes a transport vehicle assembly 20, a cargo housing assembly 40 and an expandable container assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Transport vehicle assembly 20 includes a transport vehicle 22 with a panel control 24 and first hydraulic actuators 26. In a suitable embodiment transport vehicle 22 may be the housing for cargo housing assembly 40. In one embodiment, panel control 24 may be located within transport vehicle 22. Nevertheless, in another embodiment, panel control 24 may be located on the exterior of transport vehicle 22. Panel control 24 may be connected to the first hydraulic actuators 26 and activate the first hydraulic actuators 26. Panel control 24 may use an electronic control. Panel control 24 may have a rectangular prism body. It is to be considered that the first hydraulic actuators 26 may be located on a bottom side of cargo housing assembly 40 wherein the first hydraulic actuators 26 are perpendicularly placed to each other and may extend protruding to the sides as best observed in FIG. 4. The first hydraulic actuators 26 may be made of a metal material to withstand constant movement. Nevertheless, it is to be considered that other materials like, carbon steel, alloy steel, tool steel, stainless steel or any other variation thereof may be suitable for the first hydraulic actuators 26.

Cargo housing assembly 40 includes a cargo housing 42, a housing base 44 and a housing side 46. Cargo housing 42 and housing base 44 may be suitable to be made of a steel material. Nevertheless, other variations of steel may be suitable for cargo housing 42 and housing base 44. Cargo housing 42 may further include expandable container assembly 60. Cargo housing 42 may have a rectangular body. Cargo housing 42 may have attached on a bottom side panel control 24. In a suitable embodiment cargo housing 42 may be attached on the back of transport vehicle 22. Housing base 44 may be attached on the cargo housing 42. It is to be considered that housing base 44 may have a rectangular body as best shown in FIG. 2. In a preferred embodiment housing base 44 may further have attached expandable container assembly 80. Housing base 44 may allow to a cargo bay. In a preferred embodiment housing side 46 may have a hollow rectangular body as best observed in FIG. 5. Housing side 46 may be located behind transport vehicle 22. It may be suitable for housing side 46 to be made of a steel material. Nevertheless, other materials like carbon steel, alloy steel, tool steel, stainless steel, manganese steel, aluminum steel or any other variation thereof may be suitable for housing side 46. It is to be considered that housing side 46 may be a housing for expandable container assembly 60. It is to be considered that housing side 46 may have a hollow body wherein one of the apertures 62a is attached on both sides of housing side 46.

An expandable container assembly 60 includes expandable container members 62, apertures 62a slidable portions 63, slidable panels 64, height panels 66, second hydraulic actuators 67, guide rails 68 and fastener rails 69. Expandable container members 62 may have a hollow rectangular prism body without top side, length side and width side as best observed in FIG. 2 as an L-shaped hexagon. It is to be considered that expandable container members 62 may have apertures 62a through each side thereof to further include slidable portions 63. In a suitable embodiment, expandable container 62 may include guide rails 68 with fastener rails 69 attached thereof on the internal sides. In a suitable embodiment, expandable container members 62, slidable portions 63, slidable panels 64 and expandable container members 62 may be suitable to be made of a steel material. Nevertheless, any other material like carbon steel, aluminum steel, stainless steel, alloy steel, metal, iron may be suitable for expandable container members 62, slidable portions 63, slidable panels 64 and expandable container members 62. In a suitable embodiment, expandable container members 62 may be located to a bottom side of housing base 44 wherein internal bases of expandable container members 62 may connect to a lateral bottom side of the housing base 44 and the internal sides of expandable container members 62 may connect to sides of housing base 44. Is it to be considered that L-shaped sides of expandable container members 62 may connect to both sides of housing side 46 as best shown in FIG. 2.

As best observed in FIG. 4, expandable container members 62 may be attached to the first hydraulic actuators 26 through the base edges thereof such that the first hydraulic actuators 26 may be activated to expand expandable container members 62. It is to be considered that both expandable container members 62 may have slidable portions 63 attached to the internal faces of expandable container members 62 as best shown in FIG. 3. Slidable portions 63 may be attached with guide rails 68 and fastener rails 69 that may be propelled by second hydraulic actuators 67. In a suitable embodiment, slidable portions 63 may have a similar body as sides of expandable container members 62 as best shown in FIG. 3. Slidable portions 63 may be configured to expand from the bases of expandable container members 62 to allow cargo housing 42 be raised up. Expandable container members 62 may have-slidable panels 64 that may extend from the L-shaped sides of expandable container members 62 as best observed in FIG. 3. In a suitable embodiment slidable panels 64 may have a similar shape as expandable container members 82. It is to be considered that slidable panels 64 may extend from each of the sides of expandable container members 62. Slidable panels 64 may be located within sides of expandable container members 62 with guide rails 68 and fastener rails 68. It should be understood that second slidable panels 65 may have a hollow rectangular body wherein height panels 66 extend thereof. In a suitable embodiment second slidable panels 65 may include guide rails 68 with fastener rails 69 horizontally placed on an internal bottom portion and on an internal top portion therein wherein second hydraulic actuators 67 may be attached on each of the guide rails 68 as best shown in FIG. 5 wherein housing side 46 may include second slidable panels 65 extend thereof. It should be understood that slidable panels 64 may extend from expandable container members 62 as second slidable panels 65 extends from housing side 46.

As best observed in FIG. 5 second slidable panels 65 may include height panels 66 therein. Second slidable panels 65 may be attached on the sides of housing side 46 as observed in FIG. 5 wherein second slidable panels 65 may be attached with second hydraulic actuators 67, guide rails 68 and fastener rails 69 which may be attached inside of housing side 46. Second slidable panels 65 may have a hollow rectangular body. Second slidable panels 65 may have second hydraulic actuators 67, guide rails 68 and fastener rails 69 attached therein. Second slidable panels 65 may be configured to extend when transport vehicle assembly 20 expands. Second slidable panels 65 may have a height panels 66 attached therein. It should be understood that height panels 66 may have a similar body as second slidable panels 65 to be capable of be attached therein. In suitable embodiment height panels 66 extend to the top from the inside of second slidable panels 65 propelled by second hydraulic actuators 67. It is to be considered that in one embodiment, second slidable panels 65 and height panels 66 may be attached on an internal side of housing side 46 as slidable portions 63 are attached on expandable container members 62. In a suitable embodiment, second hydraulic actuators 67, guide rails 68 and fastener rails 69 may be made of a carbon steel. Nevertheless, it should be considered that any other material like stainless steel, alloy steel, metal, synthetic, woven wire, rigid rubber, aluminum or any other variation thereof may be suitable for second hydraulic actuators 67, guide rails 68 and fastener rails 69. Guide rails 68 may be attached on an internal side of expandable container members 62 as best observed in FIG. 3 wherein one of the guide rails 68 includes one of the second hydraulic actuators 67 attached therein and one of the fastener rails 69 is attached to an end portion second hydraulic actuators 67. Guide rails 68 may have a rectangular body. Fasteners rails 69 may have a cylindric body. In a suitable embodiment the second hydraulic actuator 67 may have a rectangular telescopic body. In a suitable embodiment guide rails 68, the second hydraulic actuators 67 and fastener rails 69 may be attached on the insides of housing sides 46, second slidable panels 65, expandable container members 62 and slidable panels 64.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A transport vehicle with an expandable cargo bay, comprising:
   wherein said transport vehicle includes a panel control therein to activate first hydraulic actuators, wherein the panel control uses an electronic control;
   a cargo housing assembly including a cargo housing, said cargo housing includes a housing base attached at rear portion thereof which can be expandable in height and width; and
   an expandable containers assembly including expandable container members, said expandable container members include an aperture on each of the lateral sides to store a slidable portions and allow expand said expandable container assembly, said expandable container members are attached to the first hydraulic actuators, wherein the first hydraulic actuators are activated to expand the expandable container members wherein the first hydraulic actuators are located on the housing base, said first hydraulic actuators are two actuators perpendicularly attached to each other, said two actuators allow a diagonal expansion/retraction of the expandable container members backwards and laterally.

2. The transport vehicle with an expandable cargo bay of claim 1, wherein said panel control is connected to the first hydraulic actuators attached to a bottom of said housing base.

3. The transport vehicle with an expandable cargo bay of claim 1, wherein said cargo housing includes a hollow housing side attached behind said transport vehicle.

4. The transport vehicle with expandable cargo bay of claim 3, wherein said housing side include guide rails attached therein.

5. The transport vehicle with an expandable cargo bay of claim 4, wherein said expandable container members include said guide rails and the first hydraulic actuators attached thereof through said apertures.

6. The transport vehicle with an expandable cargo bay of claim 4, wherein said guide rails are attached to a top portion and a bottom portion thereof.

7. The transport vehicle with an expandable cargo bay of claim 1, wherein said expandable container members include slidable panels that extend from said apertures.

8. The transport vehicle with an expandable cargo bay of claim 1, wherein said expandable container members include the slidable portions attached on internal sides thereof to allow a telescopic configuration.

9. The transport vehicle with an expandable cargo bay of claim 1, wherein said expandable container members include fastener rails attached on an ending of each of the first hydraulic actuators.

10. A transport vehicle with an expandable cargo bay, comprising:
    wherein said transport vehicle includes a panel control attached therein wherein said panel control is connected to two hydraulic actuators which are attached to a bottom side of a housing base;
    a cargo housing assembly including a cargo housing with a rear housing base which includes a hollow housing side attached behind said transport vehicle, said housing side include guide rails attached therein; and
    an expandable containers assembly including expandable container members, said expandable container members include an aperture on each of the lateral sides which include slidable panels that extend thereof and include guide rails and said two hydraulic actuators are attached thereof through said apertures, wherein said guide rails and the two hydraulic actuators are attached to a top portion and a bottom portion thereof and fastener rails are attached on an ending of each of the two hydraulic actuators, said expandable container members include slidable portions attached on an internal sides thereof wherein the two hydraulic actuators are perpendicularly attached to each other, said two actuators allow a diagonal expansion/retraction of the expandable container members backwards and laterally.

11. The transport vehicle with an expandable cargo bay of claim 10, wherein said two hydraulic actuators controlled by said panel control are attached to each of the expandable container members to extend outwardly said expandable container assembly.

12. The transport vehicle with an expandable cargo bay of claim 10, wherein said housing side includes slidable panels with height panel attached therein with said fastener rails and said guide rails, both propelled by the two hydraulic actuators attached therein to extend said slidable panels.

13. The transport vehicle with an expandable cargo bay of claim 10, wherein said height panels are attached with said fastener rails propelled with second hydraulic actuators through said guide rails.

14. The transport vehicle with an expandable cargo bay of claim 13, wherein said slidable portions are attached with fastener rails which are attached to an ending of said second hydraulic actuators placed through guide rails located on the internal sides of said expandable container members to be extended.

15. A transport vehicle with an expandable cargo bay consisting of:
    wherein said transport vehicle includes a panel control attached therein wherein said panel control is connected to first hydraulic actuators which are attached to a bottom side of a housing base;
    a cargo housing assembly including a cargo housing with a rear housing base which includes a hollow housing side attached behind said transport vehicle, said housing side include guide rails attached therein, wherein said housing side includes slidable panels with height panel attached therein with fastener rails and said guide rails, both propelled by second hydraulic actuators attached therein to extend said slidable panels; and
    an expandable containers assembly including expandable container members, said expandable container members include an aperture on each of the lateral sides which include said slidable panels that extend thereof and include guide rails and the second hydraulic actuators attached thereof through said apertures, wherein said guide rails and said second hydraulic actuators are horizontally attached to a top portion and a bottom portion thereof and fastener rails are attached on an ending of each of the second hydraulic actuators, said expandable container members include slidable portions attached on an internal sides thereof, said slidable portions are attached with fastener rails which are attached to an ending of the hydraulic actuators placed through guide rails located on the internal sides of said expandable container members to be extended, said expandable container members are attached to the first hydraulic actuators, wherein the first hydraulic actuators are activated to expand the expandable container members, wherein the first hydraulic actuators are located on the housing base, said first hydraulic actuators are two actuators perpendicularly attached to each other, said two actuators allow a diagonal expansion/retraction of the expandable container members backwards and laterally.

* * * * *